(12) United States Patent
Fong et al.

(10) Patent No.: US 11,675,634 B2
(45) Date of Patent: Jun. 13, 2023

(54) FINDING THE OPTIMUM TIME TO PRESTART CONTAINER RUNNING FUNCTIONS USING EVENTS

(71) Applicant: EMC IP Holding Company LLC, Hopkinton, MA (US)

(72) Inventors: Victor Fong, Medford, MA (US); Xuebin He, Westwood, MA (US); Prasenjit Roy, Hyderabad (IN); Nisanth Mathilakath Padinharepatt, Palakkad District (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 1 day.

(21) Appl. No.: 16/887,660

(22) Filed: May 29, 2020

(65) Prior Publication Data
US 2021/0373978 A1    Dec. 2, 2021

(51) Int. Cl.
| G06F 9/54 | (2006.01) |
| G06F 9/48 | (2006.01) |
| G06N 3/04 | (2023.01) |
| G06N 3/049 | (2023.01) |

(52) U.S. Cl.
CPC ............ *G06F 9/542* (2013.01); *G06F 9/4843* (2013.01); *G06F 9/546* (2013.01); *G06N 3/049* (2013.01)

(58) Field of Classification Search
None
See application file for complete search history.

(56) References Cited

U.S. PATENT DOCUMENTS

| 6,131,186 | A  | * | 10/2000 | Rubin ..................... G06F 9/542 |
| | | | | 717/124 |
| 9,047,025 | B2 | * | 6/2015 | Zeng ..................... G06F 3/1207 |
| 9,658,883 | B2 | * | 5/2017 | Nagasawa ............. G06F 9/4881 |
| 9,952,964 | B2 | * | 4/2018 | Collier ....................... G06F 8/10 |
| 10,296,367 | B2 | * | 5/2019 | Bianchini ........... G06F 9/45533 |
| 10,404,687 | B2 | * | 9/2019 | Malkapuram ......... H04L 67/141 |
| 10,521,730 | B1 | * | 12/2019 | Eicher .................... G06N 20/00 |
| 10,713,080 | B1 | * | 7/2020 | Brooker ............. G06F 9/45558 |
| 2013/0167126 | A1 | * | 6/2013 | Iyer ....................... G06F 9/4843 |
| | | | | 718/102 |
| 2016/0350147 | A1 | * | 12/2016 | Sumida ................. G06F 9/4843 |
| 2021/0064388 | A1 | * | 3/2021 | Gardner ............. G06F 11/3423 |

* cited by examiner

*Primary Examiner* — Umut Onat
(74) *Attorney, Agent, or Firm* — Workman Nydegger

(57) ABSTRACT

A method includes identifying a first event that has been at least partly performed, wherein the first event comprises an element of a sequence of events, and the first event comprises performance of a first computing function, predicting a second event expected to occur next in the sequence after completion of the first event, and the second event comprises performance of a second computing function, predicting a start time of the second event, based on information about the second event, identifying a particular container capable of implementing the second computing function associated with the second event, predicting a start time for start-up of the container, starting up the container, and completing start-up of the container prior to receipt of a request for the second computing function to be performed by the container, wherein the container is ready to perform the second computing function immediately after start-up has been completed.

20 Claims, 11 Drawing Sheets

```
{
  "events" : [
    {
      "name" : upload-file-to-encrypt",
      "service" : "storage" ,
      "estimate-time" : "16 seconds"
    {
    ]
}
```
100  FIG. 5B

```
const { register } = require( 'events_generator' ) ;
exports.function2 = ( req, res) => {
  register(req.body.parameters) ;
  ...
};
```
200  FIG. 5D

```
events:
- name: invoke-funtion-a
  type: function
  parameters: ['halloween', 6]
```
300  FIG. 5E Example 1

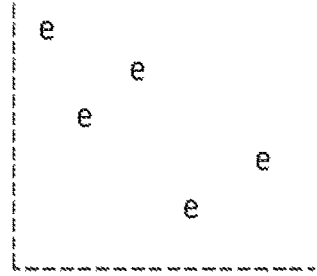

Legend:
    X-axis -> Time
    Y-axis -> event wall (DMZ)

1. Let us have an event(e) flow which are all spaced 1ms apart.
2. A function pool of size P
3. If each function takes 2ms to serve and event.
   a. Scenario 1:
      i. Pool size = 1
      ii. The amount of time for each event must wait to be served increases by a millisecond for each event
   b. Scenario 2:
      i. Pool size = 2
      ii. The amount of time for each event is reduced to 0 as there will always be a function ready in the pool to serve

FIG. 9

Example 2

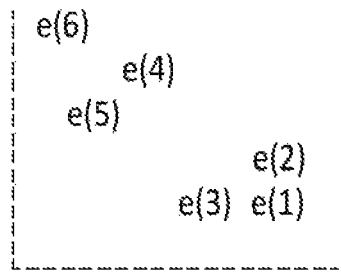

Legend:
    X-axis -> Time
    Y-axis -> event wall (DMZ)

1.    Let us have the event flow with events simultaneously flowing at the same time instant. In the case the pool size needs to be pre calculated early on based on their time of arrival.

2.    In this scenario at $T_0$ we have two events ready to be served by our function pool.

a.    Scenario 1:
            i.    Pool size = 2
            ii.    In this case each event after the first two are served will have to wait at least a second before they are taken up for execution
            iii.    Resolution?

FIG. 10

Example 2

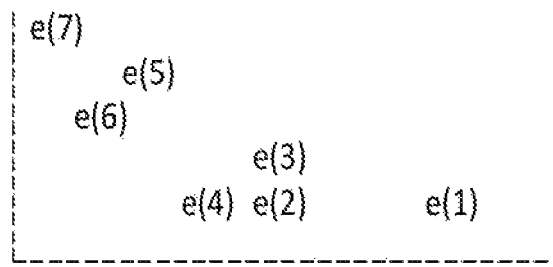

Legend:
    X-axis -> Time
    Y-axis -> event wall (DMZ)

1.    Let's have the event flow with events simultaneously flowing at the same time instant and unequally spaced event flow. In the case the pool size needs to be pre calculated early on based on their time of arrival at the Pool.
  2.    In this scenario at $T_0$ we have e(1) and at $T_4$ we have e(2) and $T_4$ we have e(3). With these event placement flow, we need an effective solution to decide the pool size.

FIG. 11

FINDING THE OPTIMUM TIME TO PRESTART CONTAINER RUNNING FUNCTIONS USING EVENTS

FIELD OF THE INVENTION

Embodiments of the present invention generally relate to workload deployment technologies. More particularly, at least some embodiments of the invention relate to systems, hardware, software, computer-readable media, and methods for container startup processes.

BACKGROUND

Container technologies such as Docker and Kubernetes are being widely used for workload deployments, especially in the serverless world such as with cloud computing platforms. For instance, most Function-as-a-Service (FaaS) solutions run each function in a dedicated container. The lifecycle of a function is relatively shorter than that of a regular application. Because of this, the start-up speed of container may be important to the execution and performance of a function.

Thus, the optimal start-up time, from the perspective of a requesting application, for a container may be about zero. For example, when a request triggers a function, the container that will perform the function is immediately available to handle the request. That is, the amount of time needed for the container to begin running after the trigger is zero, or near zero.

While a zero, or near-zero, container start up time may be optimal, the startup process for a container may involve many different steps. As such, it may be difficult or impossible to optimize, that is, minimize, the length of time needed for container start-up. For example, it may be difficult to predict which containers will need to be started for a particular task or job. As another example, it may be difficult to determine when the optimum time is to start a container or containers.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

FIG. 5*b* is an example code package for an upload event.

FIG. 5*d* is an example code package for a library function.

FIG. 5*e* is an example code package for an event in YAML format.

FIGS. 9, 10, and 11, disclose example scenarios that may be addressed by embodiments of the invention.

DETAILED DESCRIPTION OF SOME EXAMPLE EMBODIMENTS

Figure 1:
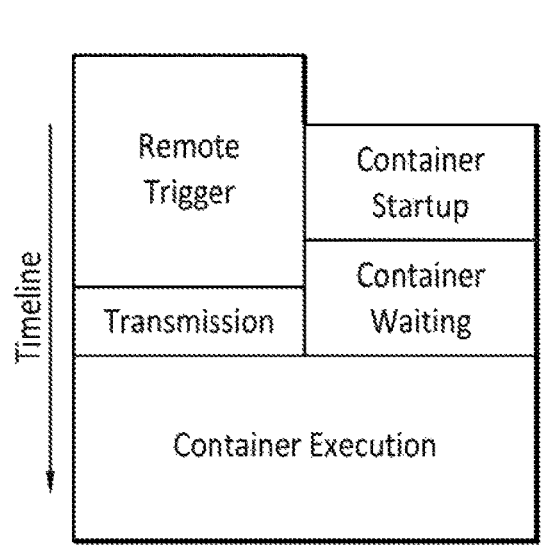
FIG. 1 discloses an example timeline in which a container is in an idle mode after startup.

Embodiments of the present invention generally relate to workload deployment technologies. More particularly, at least some embodiments of the invention relate to systems, hardware, software, computer-readable media, and methods for container processes such as, but not limited to, predicting which container(s) may need to be started, and determining an optimum time for container startup. In this way, improvements in the performance of the applications that operate in connection with the containers may be realized.

In general, example embodiments of the invention may involve the use of events and function invoking chains to predict which container(s) to start and when to start those containers. Example embodiments may comprise three components, namely, an event generators, an event analyzer, and a container executor. Depending upon the particular implementation, these components may be combined or split into more components, or combined with existing container orchestration platforms.

With respect first to the event generator, it may be known, for example, that in a sequence of processes including Process 1 and Process 2, the Process 2 will be performed some time after Process 1. The event generator may take notice of the relation between Process 1 and Process 2, which may be referred to in terms of parameters, and the fact that Process 1 has already been performed. This information may be used by the event generator to send an event to the event analyzer to trigger the performance of Process 2 in advance of when Process 2 might otherwise be performed.

This approach to predicting the next event, that is, Process 2, in a sequence of events, may be referred to as constituting a deterministic approach. That is, the event analyzer may use the information in the event, namely, Process 1 and one or more parameters that relate Process 1 to possible subsequent processes that may be triggered by Process 1, to determine which event will occur next in the sequence after Process 1. After the event analyzer has determined which event will occur next in time after Process 1, the event analyzer may then access a policy that specifies which containers to start to service that event.

In some cases, a deterministic approach may not be possible or practical. In these cases, the event analyzer may use a machine learning approach, rather than events from the event generator, to predict the next event in a sequence of events. After the event is predicted, the event analyzer may then access a policy that specifies which container(s) to start to service the predicted event.

The start times for one or more of the identified containers may be determined by policies and/or other criteria. For example, a policy may specify whether to create a container, or what container to create when an event is received from the event generator.

The executor may receive a container start request, which may specify container start times and any delays, from the event analyzer. Depending upon the start times received, and delay information, the executor may start an identified container immediately, and/or may start another container after the delay has run.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect is that an embodiment of the invention may predict which containers may need to be started to support an application operation. An embodiment may predict start times, which may be optimum start times, for one or more containers. An embodiment may start a container in advance of when it is needed, which may result in a zero or near-zero startup speed when the container is invoked. An embodiment may employ feedback of various times in the determination of an optimum start time for a container. An embodiment may use historical information, such as a sequence of events that have occurred up to a particular time, to predict when one or more subsequent events may occur. An embodiment may employ a deterministic approach to identify a next event in a sequence of events. An embodiment may use historical information, such as a sequence of events that have occurred up to a particular time, to predict the length of a time gap before one or more subsequent events occur. An embodiment may employ a mathematical approach to calculate an optimal container startup time based on an event stream.

A. General Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, container start operations, and related operations. One or more containers may perform respective functions, for example, of an application. Example operations performed by a container, or group of containers, may include, but are not limited to, data read/write/delete operations, data deduplication operations, data backup operations, data restore operations, data cloning operations, data archiving operations, disaster recovery operations, and any operations relating to the operation of an application at a client site or elsewhere. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example public cloud storage environments in connection with which embodiments of the invention may be employed include, but are not limited to, DELL® CLOUD STORAGE, MICROSOFT® AZURE®, AMAZON® AWS®, AND GOOGLE® CLOUD. More generally however, the scope of the invention is not limited to employment of any particular type or implementation of cloud storage.

In addition to the storage environment, the operating environment may also include one or more clients with applications that are capable of collecting, modifying, and creating, data. As such, a particular client may employ, or otherwise be associated with, one or more instances of each of one or more applications that perform such operations with respect to data.

Devices in the operating environment may take the form of software, physical machines, or virtual machines (VM), or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take various forms, such as a .VMDK file for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview

As noted earlier, various circumstances may result in the degradation of the performance of applications by failing to keep container startup times at an acceptable level. These circumstances generally concern difficulty in determining which containers will need to be started to support application operations, and difficulty in deciding upon optimum start times for containers.

In more detail, production environments may employ a large number and variety of containers for performing various functions. For example, in a container-based production environment, a Function as a Service (FaaS) cluster may run hundreds, or even more, containers at the same time. Some containers may be destroyed and created very frequently, especially on FaaS or Serverless platforms, since such platforms only charge users by how much time and resources were consumed in the performance of the function by the container(s). To keep the cost of performing operations down, such platforms may not run the workloads, that is, containers that are not being used. Thus, it may be difficult to predict which containers may be needed at any particular time.

Moreover, and with particular reference to FIG. 1, it may be difficult to determine when the optimum time is to start a container. This may be true even if a capability existed to predict which container(s) would need to be started. The startup timing of a container may important to the performance of the function and the host machine in general. If the container starts and warms up before the time the actual request has come in, such as in response to the 'Remote Trigger,' for the function performed by that container, then the customer needs to pay for the cost of running that container between the time the container was started ('Container Startup') and accepting a request to perform the function. This time period is indicated as 'Container Waiting' in FIG. 1. Note that the 'Container Startup' process has completed even before the 'Remote Trigger' triggers 'Transmission' of the function request. Thus, an advantage of this approach may be that the container startup time is zero, or near zero, since the container is already running ('Container Waiting') when the request is accepted.

Figure 2:
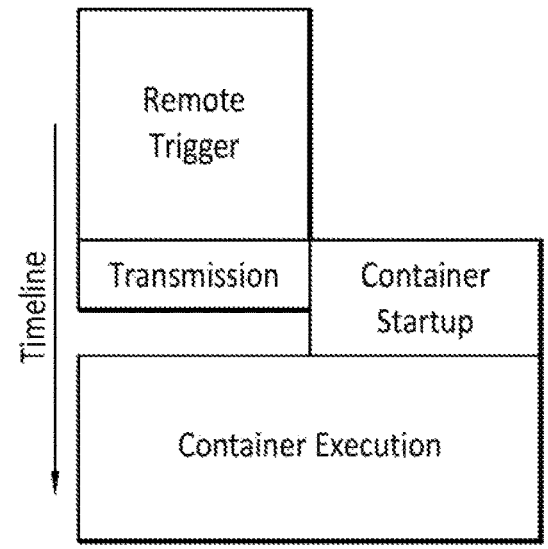
FIG. 2 discloses an example timeline in which there is a time delay between completion of container start-up and container execution.

On the other hand, and with reference to FIG. 2, if the container is not already running, there may be a period of time, or gap, between the time when the request is accepted, that is, after 'Transmission' of the request, and the time when 'Container Startup' has completed and the request is resolved, that is, when 'Container Execution' begins. Thus, 'Container Execution' is delayed until after 'Container Startup' is complete. As such, the cost associated with this case may be less than that associated with the 'Container Waiting' scenario, since in the example of FIG. 2, 'Container Startup' is not preemptively performed, but only begins at about, or shortly after, the 'Remote Trigger' has occurred. That is, the customer does not have to pay for any idle 'Container Waiting' time.

With these considerations in view, attention is directed now to a brief overview of aspects of some example embodiments. As noted earlier, container technologies are being widely used for deployments. There may be many advantages of adopting container technologies, such as isolation, standardization, and mobility, for example. However, there is also a pain point of using containers in some scenarios, relating to the starting time of a container.

To illustrate, Knative is a FaaS platform built on top of Kubernetes and using containers to run functions. Unlike websites or traditional workloads, functions may have a relative shorter lifecycle. For example, it may be typical for the lifecycle of a function container to be measured in milliseconds. However, starting a container from a static image can take up to few seconds. Thus, the start-up time of a container may play a critical role in the performance of the function.

There are some conventional technologies directed to attempting acceleration of the starting process of a container. However, if the time of container creation could be predicted, then container orchestration platforms would not need to further reduce container start-up time since, due to knowledge of the predicted start time, the container may be started in advance and may be ready for operation before a request for the container function is received. Note that as used here, 'container startup time' refers to the amount of time that a container needs to get up and running. A 'container execution time' refers to a particular time when the container begins to perform its function.

Figures 3, 4:
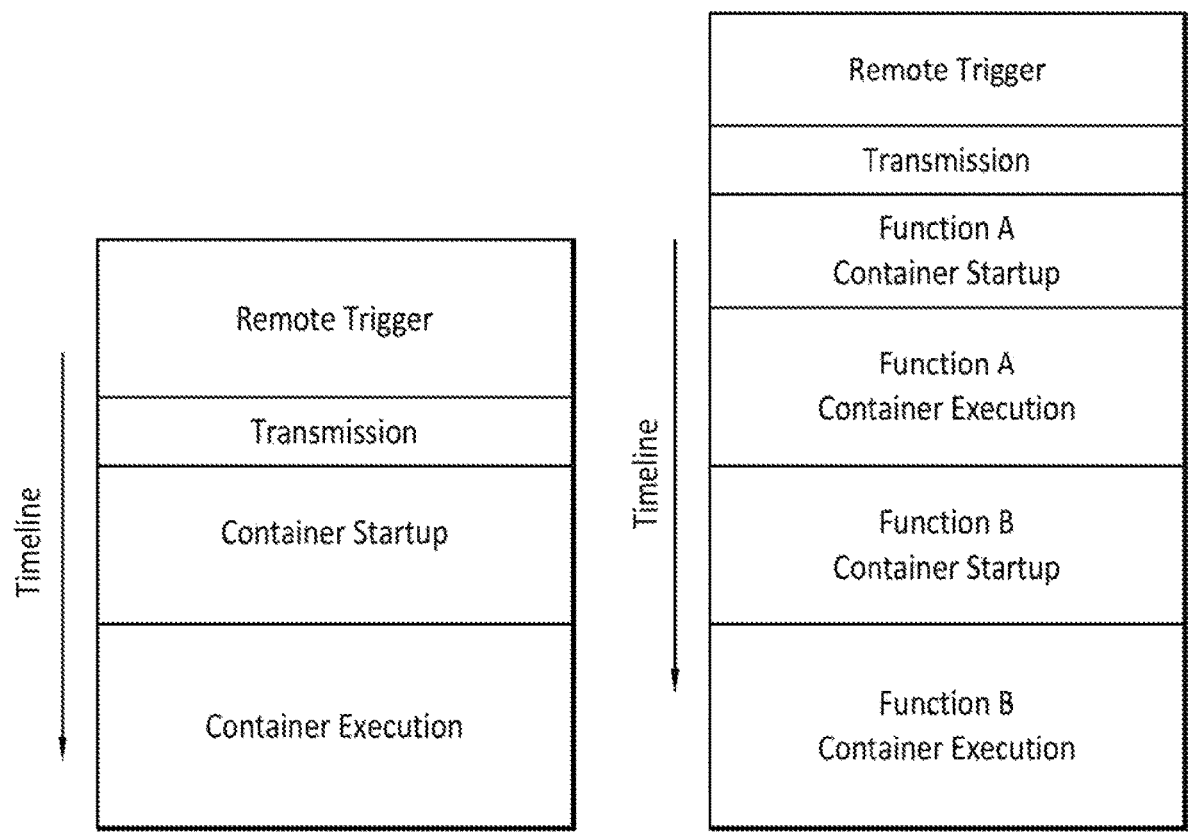
FIG. 3 discloses a timeline in which a container does not experience a time delay or idle time.
FIG. 4 discloses a timeline similar to that in FIG. 3, involving multiple containers.

When registering a new function on a FaaS or a serverless platform, it may be required to define the trigger for that function, that is, the event or events whose performance causes, or triggers, performance of the function. When a trigger is being made, the function that the trigger is bonded to may be invoked. For example, one lar trigger that may be employed is an HTTP endpoint, as shown in FIG. 3. Particularly, the timeline of events in the example case where an HTTP endpoint is the trigger may be as follows: first, the trigger event may occur; next, a request for the function to which that trigger is bonded may be transmitted; third, container startup may begin after receipt of the request; and, finally, container execution may proceed after the container has completed its startup process.

However, and with reference now to FIG. 4, a trigger event need not be remote and could, for example, be the running of one or more other functions. As shown in the example of FIG. 4, function A will always invoke function B. In this illustrative example, the event triggering starting container for function B may be the running of function A. Thus, if the remote events or the function invoking chain can be predicted or prefetched, then the functions that are related to such events or invoking chain may possibly be executed soon, or sooner than would otherwise be the case if the system was required to wait for the container to startup, as illustrated in the example of FIG. 2. Even if the next container to start has been determined, there may still be a need to determine when to start this container.

As discussed in more detail below, embodiments of the invention embrace mechanisms to streamline container start-up based on event prediction. In this way, the time of waiting for a function to start and run may be reduced, so that applications may realize performance improvements, at least in terms of the speed with which their associated functions are performed.

Note that various terms may be used herein with respect to the containers. Particularly, 'container start-up time' refers to the amount of time that is needed to get a container up and running so that the container is able to perform its function(s). Further, 'container start time' refers to the particular point in time when the container start-up process begins. Finally, 'container execution time' refers to the time when the container begins to perform its function(s). As disclosed herein, container execution time may occur immediately after container start-up is complete, or may be delayed for a period of time after container start-up is complete.

C. Further Aspects of Some Example Embodiments

Figure 5A:
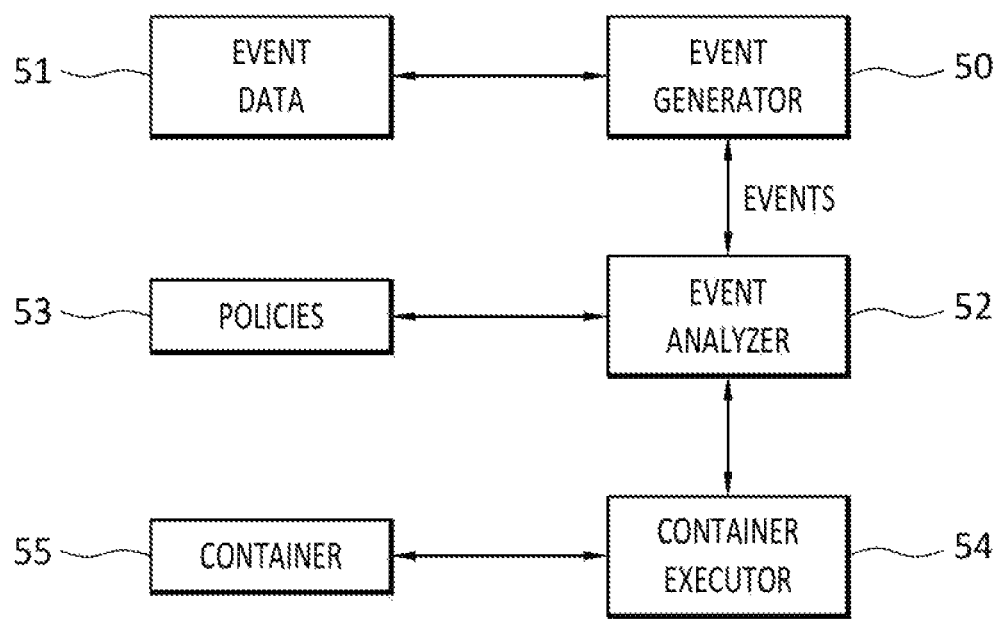
FIG. 5*a* discloses an example architecture and functional configuration of an event generator, event analyzer, and container executor.

It was noted earlier that embodiments of the invention may employ events and function invoking chain to predict which container to start, and when to start the container. As shown in FIG. 5a, example embodiments may comprise components such as an event generator 50, an event analyzer 52, and a container executor 54. The event generator 50 may gather event data 51, the event analyzer 52 may decide which containers to start, and when, based on one or more policies 53, and the container executor 54 may execute one or more containers 55.

C.1. Event Generator

Attention is directed first to a discussion of aspects of an example event generator 50. In general, a user action on a software/application may start a process that involves several actions and/or functions in sequence. For example, if a website provides a service to upload local files and encrypt them in cloud storage, after the moment the user hits the 'upload button,' the user machine may stream the local file to the remote platform, and when the file is fully uploaded, an encryption function may be invoked to encrypt the uploaded file.

In some case, actions in a process may take place sequentially, one after another. In the aforementioned example, invocation of the encryption function will happen after the user hits the 'upload' button. Thus, it is known that encryption will occur at some point in time after the file has been uploaded, though it may not necessarily be known particularly when encryption will be performed.

Thus, an example event generator 50 may be used to catch the 'upload' action, which may be an example of event data 51, and send an event to the event analyzer 52 to trigger the encryption function in advance instead of waiting for the encryption function to be invoked by the original trigger, that is, the uploading of the file. In this way, the encryption function is triggered preemptively so that when the encryption request is received, the encryption function may begin immediately.

The event generator 50 may be implemented in various ways, such as a code library that may be used by developer, so that every time the user interacts with the application, the code library, or event generator 50, would generate a corresponding event and send it an event analyzer. The format of events can be JSON, XML, YAML or any other format that can be serialized to be transmitted on the network. For example, the aforementioned upload event may be described in JAVASCRIPT® (computer programs) Object Notation (JSON) using code package 100 of FIG. 5b.

The event generator 50 may also be implemented as a binary that can run on itself, so that the event generator 50 may actively collect event data 51 from different areas for generating events based on predefined mechanisms. Those areas may be, for example, networking, logging, FaaS, or serverless platform.

In a conventional application, a user action may invoke several different application functions in sequence or in parallel. An FaaS/serverless platform may operate similarly. One difference, however, between a conventional application and FaaS/serverless platform is that such functions may registered individually on FaaS/serverless platform, instead of being part of an application. In this approach, a function may be invoked by a variety of different applications and is not necessarily restricted to operating in connection with a single application.

In the FaaS/serverless environment, functions may still invoke each other by various approaches, such as an HTTP request pub/sub or message bus for example, provided by the platform instead of being invoked in memory. Thus, it may be possible to predict which function may be invoked by checking which function is running with what parameters.

Figure 5C:
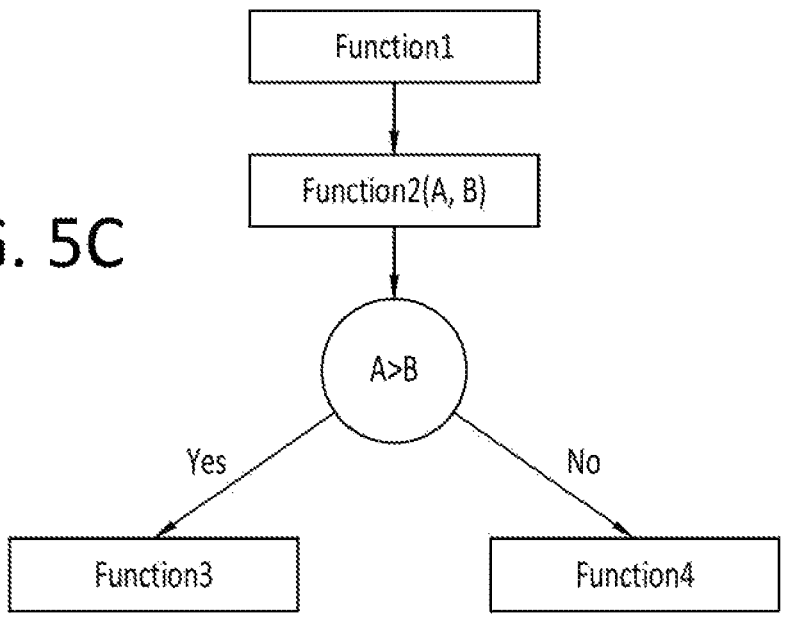
FIG. 5*c* discloses the use of parameters and functions to determine which subsequent function(s) will be performed.

With reference now to the illustrative example of FIG. 5c, it can be seen that Function1 will call Function2. In this case, the moment Function1 is triggered, the container that has Function2 built-in may be started in advance even if, for example, Function1 has not yet completed. In some cases, Function1 may call different functions based on the value of various parameters. To illustrate, if Function2 is called with the value of parameter A larger than B, Function3 may be invoked, otherwise, Function4 may be invoked.

The event generator 50 may generate events for which one or more functions were triggered. The events may specify information that enables a determination to be made as to the next event that will occur in a sequence of events. For example, and with continued reference to the example of FIG. 5c, if it is known that Function1 will call Function2, and that Function3 and Function4 relate to Function2 as expressed by parameters A and B, all of that information may be included in an event. This information may then be used by the event analyzer 52 to determine, for example, which event will occur after Function2. Various methods may be employed by the event generator 50 and/or other entities to collect event data 51 for inclusion in one or more events created by the event generator 50.

For example, a listening process may be employed by the event generator 50 to listen on a network for packets that match the trigger. For example, some triggers may be defined as a URL, and one or more parameters may be found inside the body of a request hitting that URL. If the event generator 50 is using networking tools, such as Wireshark for example, to monitor network traffic, it may be possible for the event generator to send an event to an event analyzer every time the URL is visited.

Another example method for gathering event data 51 for inclusion in an event, and/or otherwise concerning an event, may involve communications with an application program interface (API) of the platform, such as FaaS/serverless platform for example, where container functions are being performed. This approach may vary from platform to platform if the platform provides such an API for developers to use for checking which functions are executing.

Still another approach to gathering event data 51 for inclusion in an event, and/or otherwise concerning an event, may involve utilizing an event library in existing functions. Such an event library may include previously created events that are applicable to processes other than those for which the events were initially created. In this way, operation of the event generator 50 may be more efficient since a new event, or events, may not need to be created in some cases. Such an event library may provide a function that can be called by the existing function, such as with one or more parameters for example. One example of such a library function is the code package 200 of FIG. 5d.

A final example of an approach to gathering event data 51 for inclusion in an event, and/or otherwise concerning an event, may involve modifying a compiler/execution engine to gather data concerning a function that is being compiled for execution by the compiler/execution engine. It may further be possible to modify, such as by using the compiler/execution engine, the language that the function is written in. In this way, the compiler may insert a process of sending an event to an event analyzer every time the function is called into the compiled binary, or the container executor 54 may send an event to the event analyzer 52 every time the function is called.

An event such as those examples disclosed herein need not have any particular format. One illustrative, but non-limiting, example of an event format may be rendered in YAML (YAML Ain't Markup Language). In general, YAML is a human-readable data-serialization language, and may be employed for configuration files and in applications where data is being stored or transmitted. FIG. 5e discloses an example event format 300 in YAML.

As discussed below in connection with the event analyzer 52, the use of a deterministic approach involving events generated by the event generator 50 may not be suited for all circumstances. Thus, in some other embodiments, a machine learning approach based on historical and/or other information may be used to determine which event may occur next in a series of events.

C.2. Event Analyzer

The event analyzer 52 may receive one or more events from the event generator 50. In at least some embodiments, the events are pushed by the event generator 50 to the event analyzer 52. Once an event has been received by the event analyzer 52 from the event generator 50, the event analyzer 52 may decide which container, or containers, to start based on one or more pre-defined policies 53. Each policy 53 may specify whether or not to create a container, or what container to create when an event is received from the event generator. Optionally, a policy 53 may specify how long the time delay should be between the time when the event analyzer 52 receives the event and the time when container executor 54 starts the container 55. The policies 53 may be defined by developers in a manual manner, since developers may have particularly good insight into the calling structure of a function, and the processes triggered by users. In cases where it may be difficult or impractical to determine the particular container(s) 55 to be started using deterministic policies, that determination may be made using a machine learning model, such as by learning patterns in the history of sequence of events. On example of such an approach is described in the section below.

Figure 6:
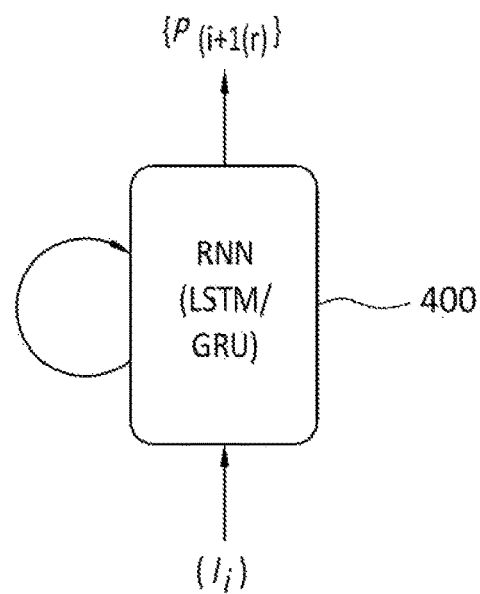
FIG. 6 discloses an example training process for a Recurrent Neural Net cell, for predicting the probabilities of events to be the next event in the sequence.

In general, and with reference to the example of FIG. 6, a neural net predictor may be used to predict the next event in a sequence of one or more related events. The neural net predictor may comprise, or implement, a Recurrent Neural Net (RNN) model 400. This neural net approach may be employed instead of events generated by an event generator to predict the next event in the sequence.

The events in the sequence may be labeled as (1), (2), (3) . . . for example. To illustrate, label the event of a new message in a messaging queue as (1), a new object uploaded in a particular object storage bucket as (2), a particular http trigger as (3), and so on. With this labelling, a sequence having a length of 'n' events may be represented as $S_n=[(I_1), (I_2), (I_3), \ldots, (I_n)]$, where 'n' is the number of events in the sequence, and $(I_i)$ is the label for the $i^{th}$ event in the sequence.

With this information, one function of the neural net predictor 400 may be to predict the next event with label, $(I_{n+1})$, given the sequence $S_n$ of events that has occurred so far. Any of a variety of models may be used to learn the patterns in the event sequences S, and for predicting the probability $P_{(n+1)(r)}$ that each possible event in a set of 'r' possible events will be the next event in the sequence. Examples of such models include, but are not limited to, the sequence (Recurrent Neural Net) models such as LSTM (Long Short Term Memory) units or GRU (Gated Recurrent Units). Any other suitable model(s) may be employed.

With continued reference to FIG. 6, a training process may be employed for the RNN 400. In particular, one or more historical sequences of events $S_n$ may be used for training the RNN 400. As shown in FIG. 6, the input to the RNN 400 cell, at any point in time, may be the individual event label $(I_i)$ in the event sequence $S_n$.

At any moment, when $(I_i)$ is at the input of the RNN 400 cell, and assuming that the event labels up until $(I_i)$, that is, event labels up to and including $(I_{i-1})$, have already been fed into the RNN 400 cell, the output of the RNN 400 cell may be a set of probabilities $\{P_{(i+1)(r)}\}$, where each probability P in the set is the probability that the event 'r' to which that probability corresponds will be the next event in the sequence $S_n$.

A loss L may be calculated considering the actual event $(I_{i+1})$ that occurred in the given sequence $S_n$ and the set of probabilities $\{P_{(i+1)(r)}\}$. The parameters of the RNN 400 may be updated by back-propagating the gradients of this loss L.

Once the RNN 400 is trained, such as by the example processes discussed in connection with FIG. 6, the RNN 400 may be used to predict the next event $(I_{n+1})$ that will occur after a sequence of events $S_n$. The input to the RNN 400 for performance of this prediction process is the sequence of events $S_n$ that have occurred so far. The output of the RNN 400, based on the aforementioned input, may be the set of probabilities $\{P_{(n+1)(r)}\}$ for each possible event 'r' that may be next in the sequence. That is, the set of probabilities includes, for each possible event, the probability that that particular event will be next in the sequence.

Using the probability information, the event (k) with the highest probability $P_{(n+1)(k)}$ to be the next event $(I_{n+1})$ may be predicted as the next event that will occur after the current sequence $S_n$. However, the prediction need not necessarily select the event of highest probability. More generally, any event of any probability may be predicted as the next event. Further, where two or more events have about the same probability, such as events whose respective probability is within about 5% to about 10% of the probability of the other events in the group, any of the events in the group may be predicted as the next event. In some embodiments, the probability information may be ignored, and the prediction made based on other information. For example, if an event is new, it may not be possible to accurately determine a probability of occurrence of that event, since there may not be adequate historical information on which to base an assessment. In this case, the new event may be assigned an arbitrary probability, such as about 50% for example.

In any case, when the next event is predicted, the container(s) associated with that event may be pre-started, that is, started prior to a request having been received for the function(s) implemented by the container(s). This pre-start may be implemented where, for example, the event is a trigger for a function, and so long as the probability $P_{(n+1)(k)}$ for that event is higher than a pre-determined threshold T. In some embodiments, T may be a tunable hyper-parameter optimizing the cost of running an application in the given FaaS platform.

When a prediction has been generated that identifies the next event predicted to occur in the sequence, a determination may then be made as to when that event will occur. It may be important to predict the time of occurrence of the next event, in order to know when to pre-start the container(s) associated with that event, particularly if that event is a trigger to one or more functions. The time gap between the current event and the next event, that is, the predicted event, may be predicted using similar RNN architecture as the RNN 400.

Figure 7A:
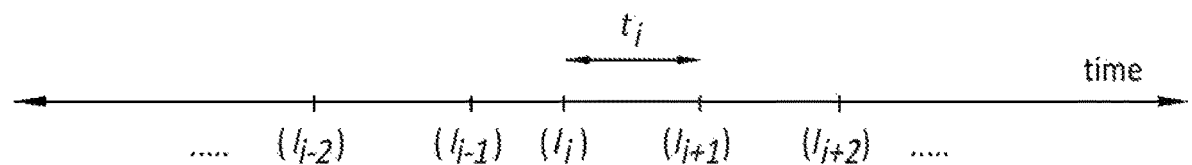
FIG. 7*a* discloses an example event timeline for a sequence of events.

With reference now to FIG. 7*a*, a time gap between events $(I_i)$ and $(I_{i+1})$ may be denoted as $t_i$. Denote $S_n=[(I_1), (I_2), (I_3), \ldots, (I_n)]$, as the sequence of events as in the previous section. Finally, denote $T_n=[t_1, t_2, t_3, \ldots, t_{n-1}]$, as the sequence of corresponding time gaps. As in the case of prediction of the next event in a sequence, a training process and a prediction process may be employed for the RNN 400 to enable the RNN 400 to make a prediction as to when the next event may occur.

Figure 7B:
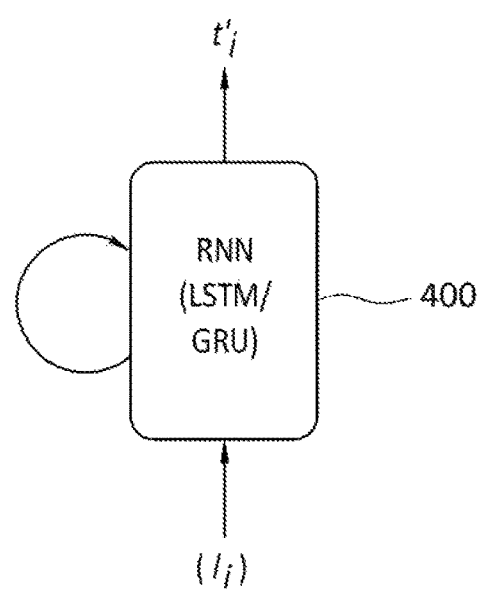
FIG. 7*b* discloses an example training process for a Recurrent Neural Net cell using a sequence of historical events, to predict the time-gap between the current event and next event.

Accordingly, and with reference now to FIG. 7*b*, a historical sequence of events $S_n$ and corresponding sequence of time gaps $T_n$ may be used for training the RNN 400. The input to the RNN 400 cell, at any point of time, may be the individual event label $(I_i)$ in the event sequence $S_n$. At any moment, when $(I_i)$ is at the input of RNN 400 cell, and assuming event labels up until $(I_i)$, that is event labels up through $I_{i-1}$, have already been fed into the RNN 400 cell, the output of the RNN 400 cell may be the prediction $t_i'$ for the length of the time gap between the most recent event $(I_i)$ and the predicted next event $(I_{i+1})$. A loss L may be calculated considering the actual time gap $t_i$ and the prediction for the time gap $t_i'$. The parameters of RNN 400 may be updated by back-propagating the gradients of this loss L.

Once the RNN 400 is trained, as described above, with respect to determining a length of a time gap, the RNN 400 may be used to predict the time gap '$t_n$' between the current event and the next event, that will occur after a sequence of past events $S_n$. The input to the RNN 400 may be the sequence of events $S_n$ that has occurred so far. The output may be the prediction for the length of the time gap '$t_n$.' The predicted length of the time gap may then be used to decide when to pre-start the corresponding function container(s). Determining the pre-start time may be particular important if the next event is a trigger for one or more functions.

Instead of using neural nets for prediction, it is also possible to use other mathematical sequence prediction models to predict the next event and the time-gap between current event and next event, by using information from the sequence of historical events.

Attention is directed now to an example mathematical model to calculate optimum container start up time. In order to facilitate the discussion, the following definitions are employed:
1. Event (e)
2. Function (f)
3. Execution time of a function (Tf)
4. Cold start-up time of a function (Cf)
5. Millisecond (ms)
6. Time at instant 'x' (Tx)
7. Chain effect event->Function triggered as a result of an event trigger of another different function.
8. Degree of separation (d)->distance from chain event 'e' to function. (default=1)
9. Event wall (DMZ)
10. Pool size of function (P)
11. Event queue (Qe)

This model may employ a degree of separation greater than 1. A problem addressed by this model may be stated as follows: At time T0 when an event (e) event enters an event wall (DMZ), it may be calculated when this event 'e' has a "chain effect" on the function (f) in question. Once the amount of time (Xms) is calculated that it would take to trigger the function (f), the next item to be calculated is if any of the functions available in the function pool will be able to serve this event.

With the execution time of a function (Tf), pool size (P) and with the event flow queue (Qe), an algorithm may be devised such that:

I. for each e in $Q_e$ check if there is a function $f$ in Pool P ready to serve after $X_{ms}$->Found II. if (not Found) start a container on or before $X_{ms}-C_f$
The following example is illustrative.

Example 1

If cold start-up time (Cf)=2 ms and execution time (Tf) is Xms=10 ms, and if there are no functions available to server the container at T10,then initiate the container start up at (Xms−Cf)=8 ms, i.e., after 8 ms have passed T-8.

Example 2

If cold start-up time (Cf)=10 ms and execution time (Tf) is (Xms)=2 ms, and if there are no functions available to serve the container at T2, then initiate the container start up at (Xms−Cf)=−6 ms, i.e., before −6 ms have passed T-6.

Note that in Example 2, it is not practical to start at −6 ms but it may provide insight on how to handle future events if there is a spike in events. It also helps to build an even more robust model based on the math.

Each of the models I. and II. noted above may be implemented in components disclosed herein. Thus, model I may be implemented by the event analyzer 52. Model II may be implemented in the container executor 54.

C.3. Container Executor

The container executor 54, which may also be referred to herein simply as an 'executor,' may be implemented with the ability to communicate with the container solution being used by the host. For example, Kubernetes exposes an API so that it is possible to interact with Kubernetes in a programmable style. The executor 54 may use that API to start/stop containers. If the API is not available, the binary may also be used by executor 54 to achieve the same goal.

The container 55 start request from the event analyzer 52 may have two or more different delay times concerning when to start the container 55. One of the start times may be based on the start and/or finish of one or more preceding event(s), and the other start time may be specified by a policy 53. The executor 55 may delay the starting of the container 55 based on either of the start times provided. If neither start time provides a delay, the container 55 may start immediately after the executor 54 receives the start request from the event analyzer 52. If both start times provide for a delay, the shorter time delay may be the default in some circumstances. Otherwise, the longer time delay may be used to defer the startup of the container 55.

If a specific container 55 is to start for the first time, upon receipt of a request to start the container 55, the executor 54 may delay sending the starting command to the container solution with the selected start time. Then the executor 54 may frequently check whether the container 55 is being used or not.

Figure 8:
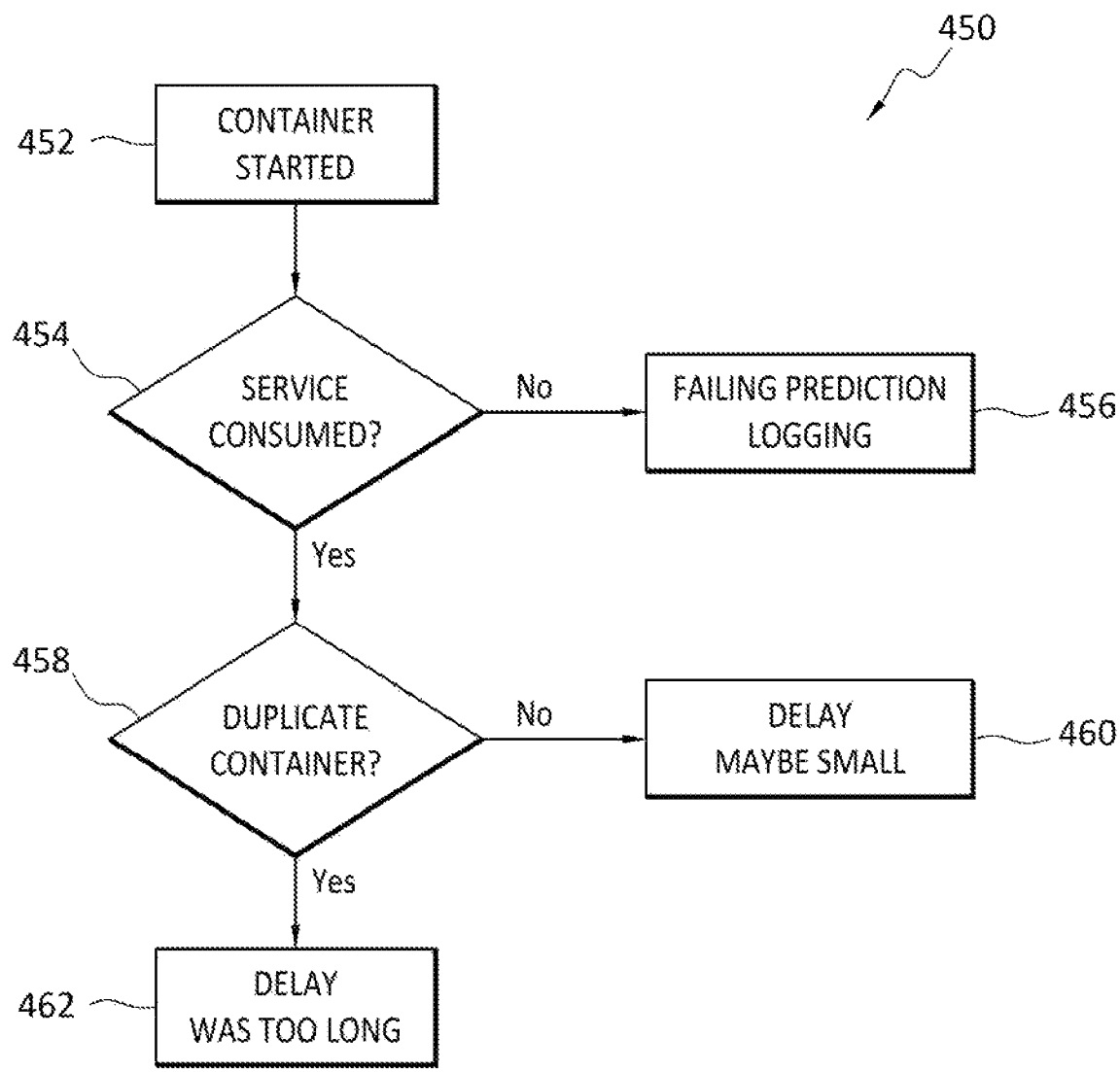
FIG. 8 discloses an example method for evaluating container operations.

For example, and with reference now to FIG. 8, a method 450 is disclosed. Initially, the container may be started 452. Next, the executor 54 may check 454 whether the port that the container 55 is listening to is visited. If the port was visited, then it may be concluded that the service or function provided by the container 55 has been consumed. If the port has never been visited within the specified time limit, it may be concluded that the prediction as to the use of that container 55, at the specified time, has failed. The executor 54 may generate a failure log 456 to help enable the developer to identify the problem, and improve the event or policy definition.

As shown in FIG. 8, the executor 54 may check 458 whether this container 55 was also created by the container solution. If the container 55 started even before the moment the executor 54 sent the start command to the container 55, in which case there may be two of the same container running then, it may be concluded 462 that the executor 54 sent the starting command to the container 55 too late. That is, the container 55 that received the starting command should have started earlier. On the other hand, if there is no second container 55 found 458 and the service was determined to have been visited, it may be concluded 460 that the container 55 started in advance successfully. And if there is waiting time between the starting of the container 55 and execution of that container 55, the delay could be larger to narrow the waiting time.

Note that it may be possible to increase/decrease the delay in container 55 start time by a percentage or absolute value each time based on the previous feedback concerning the same container 55. This correction may be different for event-provided delay and policy-provided delay. The corrections may enable the executor 54 to find the optimum delay for each container 55.

D. Further Discussion of Some Example Embodiments

Some further discussion is now provided concerning particular aspects of some example embodiments. As noted elsewhere herein, one aspect of some example embodiments is that they may employ events to start containers, in advance of when they are needed, in an FaaS/Serverless platform environment. Since functions may have a relatively shorter lifecycle, the time that it takes for the container that provides that function to startup may significantly impact function performance. Thus, eliminating the start-up time, from the perspective of an application, of a container may significantly improve the function performance since the function is ready to operate immediately upon request and there is no time delay while the function starts up. Further, because an application may comprise hundreds, or even thousands, of functions, increasing the performance of each function may provide a significant improvement in the user experience of an application running on FaaS/Serverless platform.

Another aspect of some example embodiments concerns the ability to use feedback information to determine an optimum time to start a container. For example, a billing model employed in many PaaS/Serverless platforms is pay by usage and run time. By starting the container in advance, the resource usage may remain the same, and the whole run time of an application maybe increase by the waiting time, as explained herein. However, with the ability to determine the right moment to start a container, without or with minimum waiting time, it may cost nothing or very little to achieve a significant improvement in performance of the same application on a FaaS/Serverless platform.

A further aspect of some example embodiments involves the use of a sequence of prior events to predict which event(s) will occur next in the sequence. Particularly, an application may comprise hundreds, or even thousands, of functions, each of which may be associated with many types of possible events. These events and functions may have very complex interdependencies, resulting in complex patterns in sequences of events that occur. A sufficiently large RNN may be able to capture these complex patterns and predict the next event that may occur after a given sequence of events has occurred. Once the next event is predicted with probability P, the decision may be made to pre-start the container that serves that particular event. Pre-starting the container this way may bring down the cost for running the application.

Example embodiments may provide for the use of sequence of events that have occurred so far, to predict the time gap till next event that will occur. As noted, the he events and functions that are part of an application deployed in FaaS platform, or other platforms, may have very complex interdependencies, resulting in complex patterns in sequences of events that occur. A sufficiently large RNN may capture these complex patterns and predict the time gap until the next event that may occur after a given sequence of events. Knowing this time gap, an optimum time to pre-start the corresponding function container may be determined, if the next event is a trigger for a function.

In a further example aspect of some embodiments of the invention, a mathematical equation, which in some embodiments is specifically limited to use in connection with containers and container start/run times, may be employed to calculate an optimal container start up time based on event stream. As the events progress through the event analyzer system tracking is performed of the events that may eventually trigger a function in question. This analyzer, based for example on the average function run time, event queue, and function pool size, calculates if a new function needs to be started. The input parameters for this equation may include function startup time, event queue, and function pool size. The output of the equation may provide a unit time which informs the event executor when to start up a container.

E. Some Example Use Cases

The following examples help to illustrate how possible example implementations of this invention may behave. The first example concerns container pre-start in a CI environment. Suppose, for example, that a software consultant company is widely using XYZ Company products for their testing environment on a serverless platform. Their tests are also written in function style since the application to be tested is written in function style.

There may be, for example, a thousand functions in this application, and the number of tests may be significantly larger than that the number of functions, so that all edge cases of each function may be covered. Another reason to run test as function is to prevent test pollutions since each test runs in its own container. It may be difficult, or impossible, to run all tests at the same time since the number of tests is quite large. However, it may also be important to finish the tests quickly so that the developer would have a quicker feedback to accelerate the application development cycle.

Given these requirements, the tests may run one after another based on the dependencies that a function has. And a certain number of tests for the functions, that are not related to each other, may run together based on the hardware resources. In this case, it is known what test will run soon. With the present disclosure built-in on the XYZ Company products, the testing process may proceed much faster since it can start a large number of tests in advance of when they are actually needed.

Some further examples are now provided that concern the use of mathematical equation for determining container start times. The following definitions are provided for reference in connection with these examples. Reference is made to FIGS. 9, 10, and 11 for further details concerning these examples. In general however, the examples of those Figures present scenarios in which the disclosed mathematical approach may be employed.

FIG. 9 presents scenarios where an event flow includes multiple events space over time, but the pool size of 1 means that each event must be served in turn. As such, while the function wait time for the first event is 0, the function wait time for the last event is 4, that is, 1 ms for each of the preceding events. The function may be performed for the entire sequence in 5 ms. As noted in FIG. 9, where the pool size is 2, there is always a function in the pool that is available to serve.

In FIGS. 10 and 11, more complex scenarios are presented in which some events overlap or occur simultaneously. As such, the disclosed mathematical approach may be used to determine the size of the pool, i.e., the type and number of containers needed to serve all the events, while also ensuring that each function of the pool is always available when needed to support its associated event(s).

Definition
1. Event (e)
2. Function (f)
3. Execution time of a function $(T_f)$
4. Millisecond (ms)
5. Time at instant x $(T_x)$
6. Event Wall (DMZ)

D. Example Methods

Figure 12:
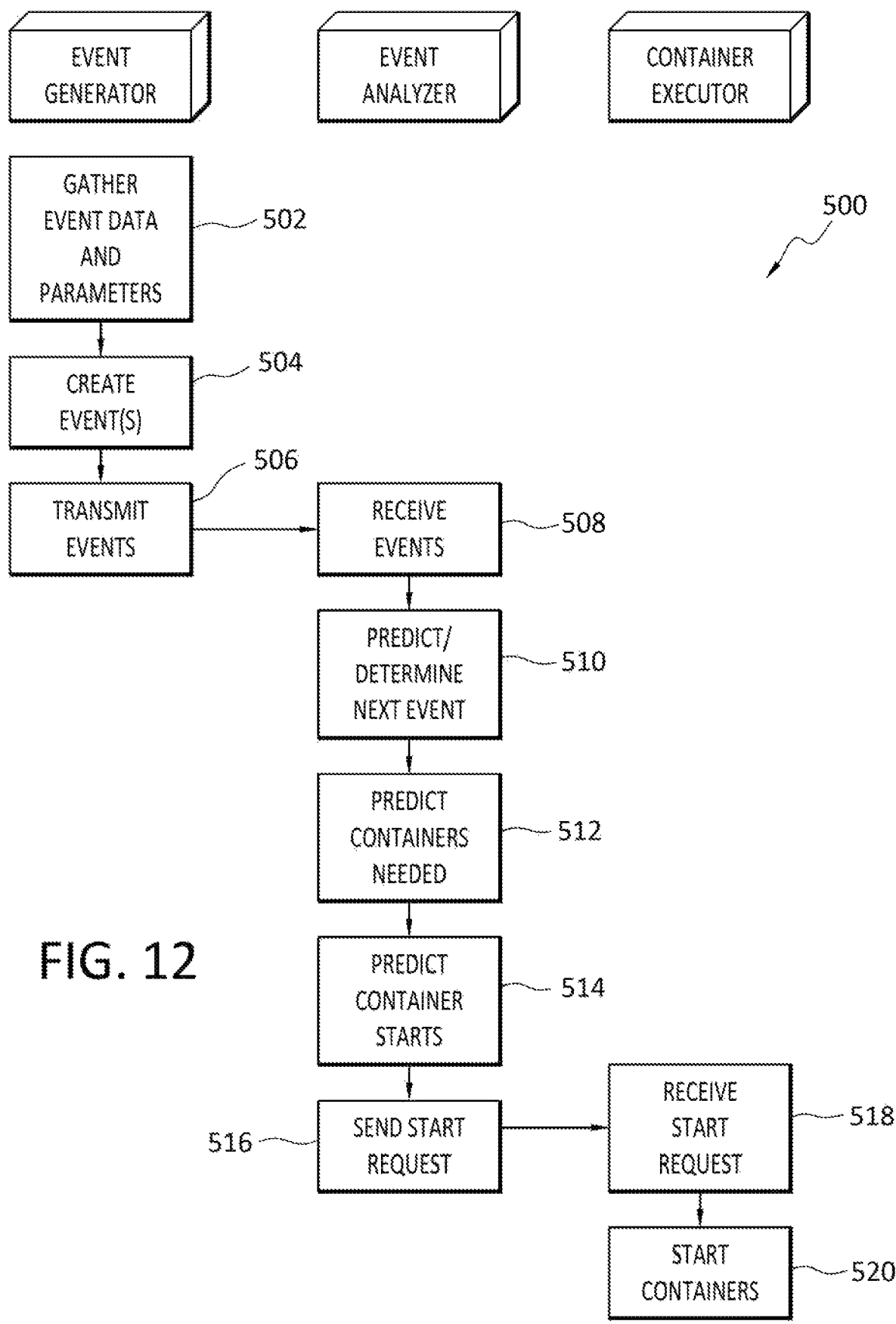
FIG. 12 discloses an example method for pre-emptive container start-up.

It is noted with respect to the example method 500 of FIG. 12, as well as any of the other disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted.

In general, the method 500 is an example of a method for predicting what container(s) will start next, in a sequence of events, and when those containers should start. Part or all of the example method 500 may be performed, for example, in a container management environment, such as KUBER-NETES® (software) for example, that is implemented in a cloud computing environment, such as AMAZON® Web Services (AWS®) for example. The example method 500 may be cooperatively performed, for example, by an event generator, event analyzer, and container executor, which may be discrete elements or may be integrated together as a single computing entity.

With particular reference now to FIG. 12, the example method 500 may begin at 502 where an entity such as an event generator gathers event data. The event data may include, for example, information about a process that has been performed, such as by a container, and information, including parameters, concerning a relation between that process and one or more other subsequent processes that have not yet been performed. The event generator may then create 504 one or more events based on, and/or including, the event data. The events may then be sent 506 by the event generator to an event analyzer to be used to trigger the performance of the subsequent process, or function, by a container.

After receipt of the event 508 from the event generator, the event analyzer may then generate, based on the received events, a prediction 510 as to which event will take place next in the sequence of events. Note that in some cases, a deterministic approach to predicting the next event using events from the generator may be omitted. In this alternative, non-deterministic, approach, processes 502 through 508 may be omitted, and the event analyzer may use a machine learning (ML) process to predict the next event based on historical and/or other information concerning one or more events that have already taken place.

After the next event in the sequence has been determined/predicted 510, the event analyzer may then determine 512, by way of one or more policies or otherwise, which container(s) are needed to support the next event in the sequence.

After such container(s) have been identified, the event analyzer may then generate a prediction as to when start-up of those containers should begin 514 so that the containers will be up and running when requested by the application with which they are associated. The event analyzer may then send a start request 516 to the container executor, identifying the container to be started up, and the time when start-up of that container should begin, that is, the container start time.

The container executor may then receive 518 the start request. Finally, the container executor may commence start-up 520 of the container at the time identified in the start request. Thus, when a request is received, such as from an application for example, for the function performed by that container, the container is immediately available to begin performing its function in response to the request. In this way, the container start-up time, from the perspective of the requesting application, is zero, or near-zero since the container is already up and running when the request from the application is received. That is, the container may be started pre-emptively before a request for its function is received.

E. Further Example Embodiments

Following are some further example embodiments of the invention. These are presented only by way of example and are not intended to limit the scope of the invention in any way.

Embodiment 1. A method, comprising: identifying a first event that has been at least partly performed, wherein the first event comprises an element of a sequence of events, and the first event comprises performance of a first computing function; predicting a second event expected to occur next in the sequence after completion of the first event, and the second event comprises performance of a second computing function; predicting a start time of the second event; based on information about the second event, identifying a particular container that is capable of implementing the second computing function associated with the second event; predicting a start time for start-up of the container; starting up the container; and completing start-up of the container prior to receipt of a request for the second computing function to be performed by the container, wherein the container is ready to perform the second computing function immediately after start-up has been completed.

Embodiment 2. The method as recited in embodiment 1, wherein the request for the function to be performed by the container is received from an application.

Embodiment 3. The method as recited in any of embodiments 1-2, wherein prediction of the second event is based on information received from an event generator, and the information comprises information about the first computing function and one or more parameters relating the first computing function to the second computing function.

Embodiment 4. The method as recited in any of embodiments 1-3, wherein the particular container is identified based on a policy.

Embodiment 5. The method as recited in any of embodiments 1-4, wherein predicting the second event expected to occur comprises determining a probability that the second event will occur.

Embodiment 6. The method as recited in any of embodiments 1-5, wherein the second event is predicted by a Machine Learning (ML) process using historical information about one or more other events in the sequence that have already occurred.

Embodiment 7. The method as recited in any of embodiments 1-6, wherein the start time of the second event is predicted using a neural net predictor.

Embodiment 8. The method as recited in any of embodiments 1-7, wherein the method is performed in an FaaS/serverless platform.

Embodiment 9. The method as recited in any of embodiments 1-8, wherein a time gap between the first event and the second event is predicted using historical information about one or more events in the sequence that have already occurred.

Embodiment 10. The method as recited in any of embodiments 1-9, wherein a plurality of parameters are used to predict the start time for the container, and the plurality of parameters comprise a start-up time for the second function, an event queue, and a function pool size.

Embodiment 11. A method for performing any of the operations, methods, or processes, or any portion of any of these, disclosed herein.

Embodiment 12. A non-transitory storage medium having stored therein instructions that are executable by one or more hardware processors to perform the operations of any one or more of embodiments 1 through 11.

F. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 13:
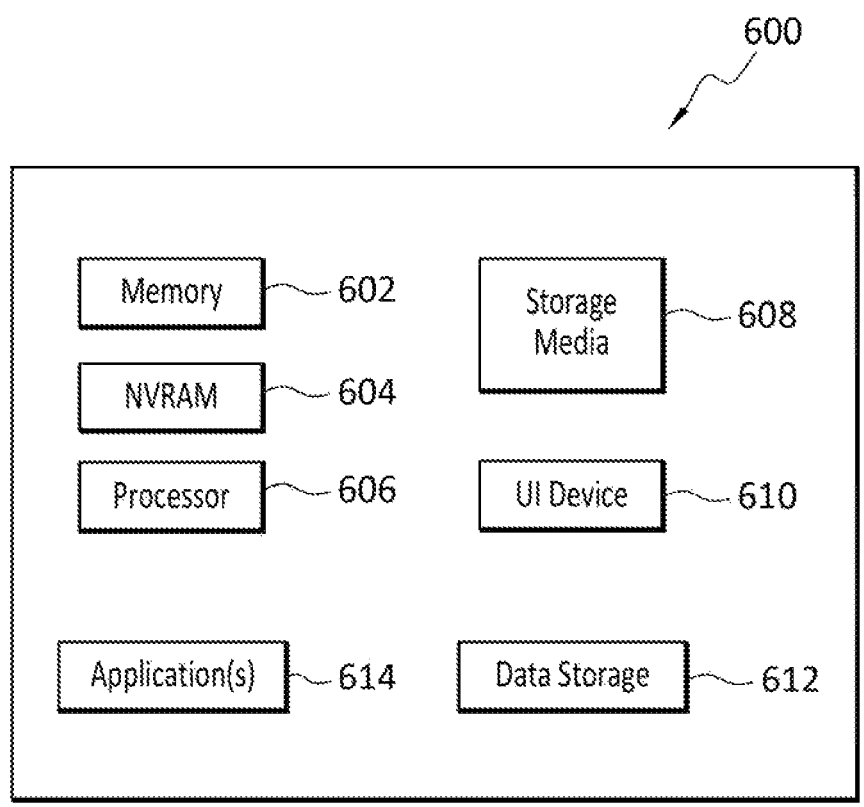
FIG. 13 discloses aspects of an example computing entity.

With reference briefly now to FIG. 13, any one or more of the entities disclosed, or implied, by FIGS. 1-12 and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 13.

In the example of FIG. 13, the physical computing device 600 includes a memory 602 which may include one, some, or all, of random access memory (RAM), non-volatile random access memory (NVRAM) 604, read-only memory (ROM), and persistent memory, one or more hardware processors 606, non-transitory storage media 608, UI device 610 and data storage 612. One or more of the memory components 602 of the physical computing device 600 may take the form of solid state device (SSD) storage. As well, one or more applications 614 may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud storage site, client, datacenter, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    identifying a first event including a sequence of computing functions including a first computing function, wherein starting execution of a first container for the first computing function triggers a second event of a second container capable of implementing a second computing function, which is different from the first computing function, without a separate triggering event for the second event;
    predicting a container start-up time of the second container for the second computing function after completion of execution of the first container;
    based on information about the second event, creating the second container that is capable of implementing the second computing function;
    starting up the second container at the predicted container start-up time; and
    executing the second container for the second computing function immediately after start-up has been completed.

2. The method as recited in claim 1, wherein the second computing function is called by the first computing function.

3. The method as recited in claim 1, wherein prediction of the container start-up time of the second container is based on information received from an event generator, and the information comprises information about the first computing function and one or more parameters relating the first computing function to the second computing function.

4. The method as recited in claim 1, wherein the second container is identified based on a policy.

5. The method as recited in claim 1, wherein predicting the container start-up time of the second container comprises determining a probability that the second event will occur.

6. The method as recited in claim 1, wherein the container start-up time of the second container is predicted by a Machine Learning (ML) process using historical information about one or more other events that have already occurred.

7. The method as recited in claim 1, wherein the container start-up time of the second container is predicted using a neural net predictor.

8. The method as recited in claim 1, wherein the method is performed in a serverless platform.

9. The method as recited in claim 1, wherein a time gap between the first event and the second event is predicted using historical information about one or more events that have already occurred.

10. The method as recited in claim 1, wherein a plurality of parameters are used to predict a container start-up time for another container, and the plurality of parameters comprise a function start-up time, an event queue, and a function pool size.

11. A non-transitory storage medium having stored therein instructions that are executable by one or more hardware processors to perform operations comprising:
    identifying a first event including a sequence of computing functions including a first computing function, wherein starting execution of a first container for the first computing function triggers a second event of a second container capable of implementing a second computing function, which is different from the first computing function, without a separate triggering event for the second event;
    predicting a container start-up time of the second container for the second computing function after completion of execution of the first container;
    based on information about the second event, creating the second container that is capable of implementing the second computing function;
    starting up the second container at the predicted start-up time; and
    executing the second container for the second computing function immediately after start-up has been completed.

12. The non-transitory storage medium as recited in claim 11, wherein the second computing function is called by the first computing function.

13. The non-transitory storage medium as recited in claim 11, wherein prediction of the container start-up time of the second container is based on information received from an event generator, and the information comprises information about the first computing function and one or more parameters relating the first computing function to the second computing function.

14. The non-transitory storage medium as recited in claim 11, wherein the second container is identified based on a policy.

15. The non-transitory storage medium as recited in claim 11, wherein predicting the container start-up time of the second container comprises determining a probability that the second event will occur.

16. The non-transitory storage medium as recited in claim 11, wherein the container start-up time of the second container is predicted by a Machine Learning (ML) process using historical information about one or more other events that have already occurred.

17. The non-transitory storage medium as recited in claim 11, wherein the container start-up time of the second container is predicted using a neural net predictor.

18. The non-transitory storage medium as recited in claim 11, wherein the operations are performed in a serverless platform.

19. The non-transitory storage medium as recited in claim 11, wherein a time gap between the first event and the second event is predicted using historical information about one or more events that have already occurred.

20. The non-transitory storage medium as recited in claim 11, wherein a plurality of parameters are used to predict a container start-up time for another container, and the plurality of parameters comprise a function start-up time, an event queue, and a function pool size.

* * * * *